/ˈ# 2,993,758
PROCESS FOR THE PRODUCTION OF HYDRAZINE HYDRATE

Hans-Joachim Abendroth, Leverkusen, and Günter Henrich, Opladen, Germany, assignors to Farbenfabriken Bayer Aktiengesellschaft, Leverkusen, Germany, a corporation of Germany
No Drawing. Filed Jan. 20, 1959, Ser. No. 787,816
Claims priority, application Germany Jan. 29, 1958
6 Claims. (Cl. 23—190)

It is known to produce hydrazine hydrate by heating a solution of sodium hypochlorite with an aqueous solution of ammonia, it being necessary to use the ammonia in excess. The reaction takes place in such manner that chloroamine is formed in the first place from sodium hypochlorite and ammonia according to Equation 1:

$$NaOCl + NH_3 \rightarrow NH_2Cl + NaOH \tag{1}$$

This chloramine then reacts further with excess ammonia to give hydrazine according to Equation 2

$$NH_2Cl + NH_3 + NaOH \rightarrow N_2H_4 + NaCl + H_2O \tag{2}$$

In this process, reaction 1 takes place instantaneously and is not dependent on the temperature and the presence of excess ammonia, whereas reaction 2 is a time reaction and only proceeds at an adequate velocity at elevated temperatures and when a relatively large excess of ammonia is present. Unfortunately, a secondary reaction 3 takes place concurrently with 2, this secondary reaction destroying the chloramine still present and hydrazine which has already formed and thus greatly reducing the yield, according to the equation:

$$2NH_2Cl + N_2H_4 \rightarrow 2NH_4Cl + N_2 \tag{3}$$

It is possible to repress reaction 3 by adding size, gelatine or similar substances, thereby promoting reaction 2.

This synthesis discovered by Raschig is limited as regards its industrial economy by the fact that a very great excess of ammonia solution is required if a satisfactory yield of hydrazine is to be produced. The hydrazine is consequently formed in a very dilute aqueous solution, from which it must subsequently be recovered, and this involves a considerable expenditure of energy.

It it for this reason that over the course of time various attempts have been made to increase the yield of hydrazine or to obtain higher hydrazine concentrations with equal yields. For example, the synthesis solution, immediately after mixing the components, has been heated very rapidly under high pressure to temperatures of from 150 to 180° C. According to other processes, the operation has been carried out in two stages, in that chloramine solution is first prepared according to Equation 1 by cooling and after adding a small excess of ammonia, this chloramine solution thereafter being reacted according to Equation 2 by adding a relatively large excess of ammonia.

According to the present invention, a process for the production of hydrazine from sodium hypochlorite solution and aqueous ammonia is proposed in which the reaction is carried out in the presence of a carbonyl compound the resulting hydrazone or azine is separated from the sodium chloride and the resulting aqueous solution is worked up to hydrazine, e.g. by decomposing the hydrazone or azine by means of an acid to the corresponding hydrazine salt and the free carbonyl compound.

Suitable carbonyl compounds for performing the invention are ketones and aldehydes of the general formula

wherein $R_1$ stands for an alkyl group or hydrogen, $R_2$ means an alkyl group, and $R_1$ and $R_2$ together do not contain more than 5 carbon atoms, e.g. acetaldehyde, acetone, propionaldehyde, methylethylketone, diethylketone and cyclohexanone.

The amount of the carbonyl compound is preferably chosen so that at least two mols of the carbonyl compound are calculated per 1 mol of the hydrazine to be prepared.

According to the invention, when using the said process, the same yields of hydrazine can be obtained using a substantially smaller excess of ammonia or higher hydrazine yields can be obtained when using the same ammonia excess.

Example 1

500 ml. of bleaching liquor, containing 76 g. of active chlorine, are diluted with 500 ml. of water and then mixed at room temperature with 1500 ml. of 25% ammonia solution and 10 ml. of an 0.1% size solution and left for several minutes at 50° C. A solution of 1.03% of hydrazine hydrate is obtained, this corresponding to a yield of 43%.

Example 2

500 ml. of the bleaching liquor containing 76 g. of active chlorine are mixed at room temperature with 500 ml. of 25% ammonia solution and 10 ml. of 0.1% size solution in the presence of 100 ml. of acetone. After a reaction period of a few minutes 50° C., a solution of 61.5 grams of dimethylketazine corresponding to 27.5 g. of hydrazine hydrate, is obtained. The concentration of the solution is 2.6%, referred to the hydrazine hydrate; the yield is 52%.

Example 3

500 ml. of bleaching liquor containing 76 g. of active chlorine are diluted with 500 ml. of water and combined at room temperature with 1500 ml. of 25% ammonia solution and 10 ml. of 0.1% size solution in the presence of 100 ml. of acetone and the mixture is kept for a few minutes at a temperature of 50° C. A solution of 91.2 g. of dimethyleketazine, corresponding to 40.7 g. of hydrazine hydrate, is obtained. The concentration of the solution is 1.5%, referred to the hydrazine hydrate; the yield is 77%.

The solutions prepared in this way can be worked up by known methods to hydrazine hydrate or hydrazine salts.

We claim:

1. Process for the production of hydrazine from sodium hypochlorite solution and aqueous ammonia which comprises reacting sodium hypochlorite and ammonia in the presence of a carbonyl compound of the general formula

wherein $R_1$ represents a member selected from the group consisting of hydrogen and alkyl groups and $R_2$ is an alkyl group, wherein $R_1$ and $R_2$ taken together do not contain more than 5 carbon atoms, wherein the amount of the carbonyl compound is chosen so that at least two mols of the carbonyl compound are used per 1 mol of the hydrazine to be prepared, separating out the reaction product thereby formed and converting the same to hydrazine.

2. Process according to claim 1 wherein said carbonyl compound is a member selected from the group consisting of acetaldehyde, acetone, propionaldehyde, methylethylketone, diethylketone and cyclohexanone.

3. Process according to claim 1 wherein said reaction product is converted to the corresponding hydrazine salt and carbonyl compound by treatment with acid.

4. Process for the production of hydrazine from sodium hypochlorite solution and aqueous ammonia which comprises reacting sodium hypochlorite and ammonia in the presence of acetone, wherein the amount of acetone is so chosen that at least 2 mols of acetone are used per 1 mol of the hydrazine to be prepared, separating out the dimethylketazine formed and converting the dimethylketazine hydrazine.

5. Process as claimed in claim 1 wherein said reaction solution additionally contains a member selected from the group consisting of size and gelatine.

6. Process as claimed in claim 4 wherein said reaction solution additionally contains a member selected from the group consisting of size and gelatine.

References Cited in the file of this patent

Audrieth and Ogg: The Chemistry of Hydrazine, John Wiley and Sons, Inc., N.Y., 1951, pages 28, 29, 32 and 44–47.

UNITED STATES PATENT OFFICE
CERTIFICATE OF CORRECTION

Patent No. 2,993,758                                                    July 25, 1961

Hans-Joachim Abendroth et al.

It is hereby certified that error appears in the above numbered patent requiring correction and that the said Letters Patent should read as corrected below.

Column 1, line 15, for "chloroamine" read -- chloramine --; line 44, for "It it" read -- It is --; column 2, line 29, after "minutes" insert -- at --; line 41, for "dimethyleketazine" read -- dimethylketazine --; column 3, line 10, before "hydrazine" insert -- to --.

Signed and sealed this 5th day of December 1961.

(SEAL)
Attest:

ERNEST W. SWIDER                                    DAVID L. LADD
Attesting Officer                                    Commissioner of Patents

USCOMM-DC